United States Patent [19]

Kilber

[11] Patent Number: 4,916,724
[45] Date of Patent: Apr. 10, 1990

[54] BITEWING X-RAY FILM HOLDERS

[76] Inventor: Trudy Kilber, 527 Birchwood Dr., Bismarck, N. Dak. 58504

[21] Appl. No.: 379,217

[22] Filed: Jul. 13, 1989

[51] Int. Cl.$^4$ ............................................. G03B 42/06
[52] U.S. Cl. ..................................... 378/168; 378/167
[58] Field of Search ......................... 378/168, 169, 170

[56] References Cited

U.S. PATENT DOCUMENTS 2,084,092  6/1937  Kenney .
3,444,371  5/1969  Via .
3,936,643  2/1976  Toner .
4,489,427  12/1984 Allison .
4,707,847  11/1987 Van Aken ............................ 378/170
4,721,209  1/1988  Guazzotti ............................ 378/169

Primary Examiner—Craig E. Church
Attorney, Agent, or Firm—Terry M. Gernstein

[57] ABSTRACT

A bite wing x-ray film holder includes at least one packet of liquid food product that is adapted to release that food product into the patient's mouth during the x-ray procedure.

6 Claims, 1 Drawing Sheet

BITEWING X-RAY FILM HOLDERS

FIELD OF THE INVENTION

The present invention relates to the general art of dentistry, and to the particular field of dental x-rays. Specifically, the present invention relates to bitewing x-rays.

BACKGROUND OF THE INVENTION

A bitewing x-ray of a patient's molars is a common diagnostic technique used in many dental examinations. Such x-ray involves placing a bitewing x-ray film holder in the patient's mouth, having the patient place the occlusive surfaces of his upper and lower molars against a tab portion of the holder, and taking an x-ray photograph of those teeth.

OBJECTS OF THE INVENTION

It is an object of the present invention to provide a bitewing x-ray film holder that makes the bitewing x-ray portion of a dental examination more pleasant than it is at the present time.

SUMMARY OF THE INVENTION

These, and other, objects are achieved by a bitewing x-ray film holder that includes at least one packet of pleasant tasting liquid food product located therein and adapted to release the food product into the patient's mouth during the x-ray process. The release can involve either a dissolving of the packet, or a rupturing of that packet, or a combination thereof, and can either be a burst of liquid or can be a timed release of such liquid.

DESCRIPTION OF THE FIGURES

FIG. 3 is a partial view of the tab portion of the bitewing x-ray film holder of the present invention showing one form of the means used to hold liquid food product for release when the patient during the x-ray process.

FIG. 4 is a partial view of the tab portion of the bitewing x-ray film holder of the present invention showing another form of the means used to hold liquid food product for release during the x-ray process.

DETAILED DESCRIPTION OF THE PREFERRED EMBODIMENT OF THE INVENTION

Figure 1:
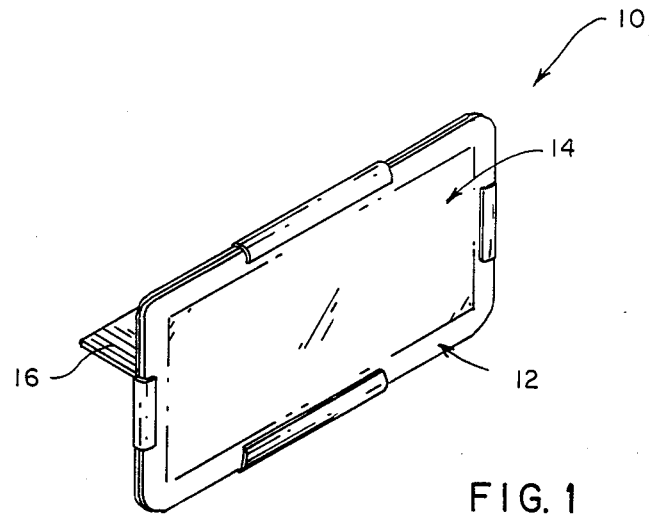
FIG. 1 is a front perspective view of the bitewing x-ray film holder of the present invention.

Shown in FIG. 1 is a bitewing x-ray film holder 10 embodying the present invention. The holder 10 is used in the manner normal to other bitewing x-ray film holders.

The holder 10 includes a backing plate element 12 on which x-ray film 14 is releasably mounted to be placed immediately adjacent to a patient's upper and lower molars to take a bitewing x-ray. The holder 10 also includes a tab element 16 that is held between the surfaces of the patient's upper and lower molars during the x-ray process. The tab element 16 is attached at a proximal side 18 to a rear surface 20 of the backing element 12 and has upper and lower surfaces 22 and 24 respectively, along with a distal side 26 located remotely from the distal end. The tab element also includes ends 28 and 30 that are spaced inside the perimeter defined by the backing plate 12.

The holder 10 is formed of fibrous material, such as cardboard or other material commonly used in such holders and the tab portion has a thickness as measured between the upper and lower surfaces 22 and 24 that is common to such holders.

The holder 10 is into a patient's mouth and between a patient's upper and lower molars, and the holder 10 of the present invention includes means for storing a liquid product that is released into the patient's mouth during the insertion and/or during the x-ray process.

Figure 2:
FIG. 2 is a rear perspective view of the bitewing x-ray film holder of the present invention.
Figure 2:
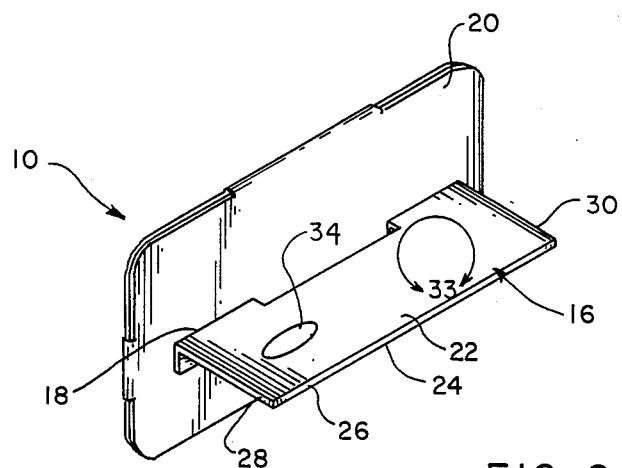

Accordingly as shown in FIG. 2, one form of the invention includes a packet 34 containing pleasant tasting liquid product, such as a liquid good product or the like, and being mounted on a surface of the tab element 16, either the top surface 22 or the lower surface 24, between the sides and ends thereof. The tab can include several packets, and such packets can be located in several positions on the tab so that as much liquid product as desired can be released. In one form of the invention, the packets are formed of rupturable material, such as thin rubber like material, or the like, or can be formed of food product itself, in the manner of gum having liquid packets inside that release liquid when the gum is chewed.

The liquid can be suitably flavored, such as cherry, mint, cinnamon or the like, or can include mouthwash or the like as desired. The above listing is to be considered as being examples only and not as limiting.

As indicated in FIGS. 3 and 4, the means can include packets embedded within the tab 16. Thus, a single packet 34' is shown in FIG. 3, and a multiplicity of packets 34" are shown in FIG. 4. These embedded packets can be used in conjunction with the mounted packet or packets shown in FIG. 2 if so desired.

In another embodiment of the invention, the packets are formed of dissolvable material that begins to dissolve as soon as it is contacted by a patient's saliva, and release the liquid contained therein as soon as it is placed in the patient's mouth without waiting to be ruptured. If the embodiments are combined, the dissolving of some of the packets will occur during the initial insertion process, and a burst of liquid will occur when the patient bites down on the tab. The dissolving material can be similar to that used in candy to release liquid as the candy is dissolved. Various forms of paper can also be used for any of the above-mentioned packets. The tabs can be colored to correspond to the flavor of the liquid if so desired.

It is understood that while certain forms of the present invention have been illustrated and described herein, it is not to be limited to the specific forms or arrangements of parts described and shown.

I claim:

1. A bitewing x-ray film holder comprising:
   (A) a backing plate element adapted to hold a dental x-ray film adjacent to a patient's upper and lower molars;
   (B) a tab element adapted to be held between occlusal surfaces of the patient's upper and lower molars; and
   (C) a means on said tab element and containing a liquid product and being openable upon insertion into the patient's mouth by action of the patient's mouth to release the liquid product into the patient's mouth during a bitewing x-ray procedure.

2. The bitewing x-ray film holder defined in claim 1 wherein said means includes a packet.

3. The bitewing x-ray film holder defined in claim 2 wherein said packet is rupturable by pressure exerted by the patient's teeth.

4. The bitewing x-ray film holder defined in claim 3 further including a plurality of packets.

5. The bitewing x-ray film holder defined in claim 2 wherein said packet is embedded in said tab element.

6. The bitewing x-ray film holder defined in claim 5 further including a plurality of packets embedded in said tab element.

* * * * *